July 10, 1928.

J. W. ROBINSON

FRUIT TRAY CLEANER

Filed June 1, 1926

1,676,801

INVENTOR
J. W. ROBINSON

BY
ATTY.

Patented July 10, 1928.

1,676,801

UNITED STATES PATENT OFFICE.

JOHN W. ROBINSON, OF WOODLAND, CALIFORNIA.

FRUIT-TRAY CLEANER.

Application filed June 1, 1926. Serial No. 112,788.

This invention resides in the provision of a simply constructed, inexpensive, strong and durable machine for cleaning fruit trays such as are used in the drying and other treatment of fruit in the preparation of the same for market, the said machine being capable of thoroughly cleaning large numbers of fruit trays in a comparatively short time and at a low cost.

One of the objects of the invention is to provide a fruit tray cleaning machine in which all that is necessary for the operator to do is to place the fruit trays one after the other into the machine, the operation of advancing the trays through the machine and cleaning thereof being automatic.

A further object of the invention is to provide in a fruit tray cleaning machine of the character described a combined automatic and manually operable means for moving the brush into and out of position to clean the tray, which said two means either of them, may be operated without effecting the other and insure a reliable and continuous cleaning operation.

Another object of the invention is to provide a fruit tray cleaning machine of the character described in which the tray as it is moved into position to be cleaned by the machine, will automatically move the brush into and out of proper position to effect a thorough cleaning without in any way damaging the tray.

A further object is to provide in a machine of the character described, novel means for mounting and adjusting the brush which may be quickly and easily operated to adapt the machine for cleaning trays of different sizes and kinds.

Another purpose of the invention is to provide a machine of the character described which may be manufactured and sold at low cost and operated by a single attendant or operator so that a large number of trays may be thoroughly cleaned in less time and at less cost than has heretofore been possible.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing.

Figure 1:
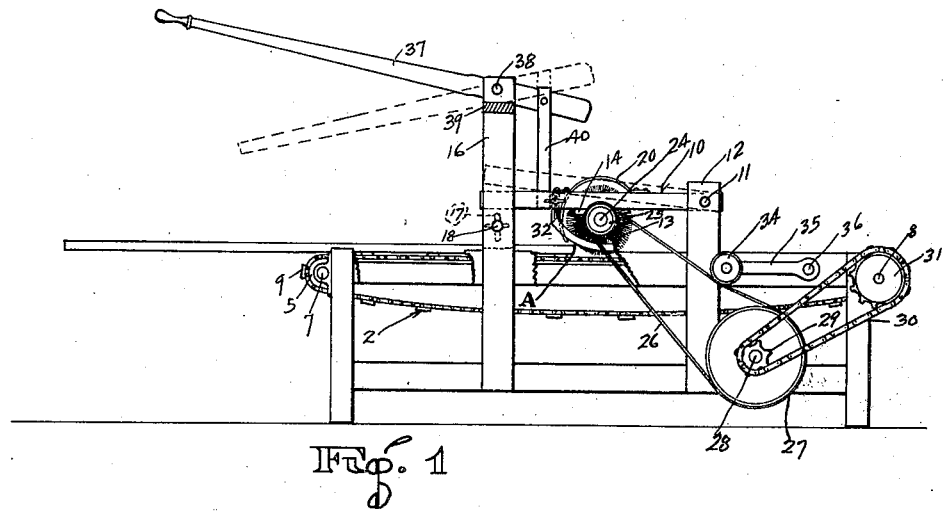
Fig. 1 represents a side elevation of the machine of my invention.
Figure 2:
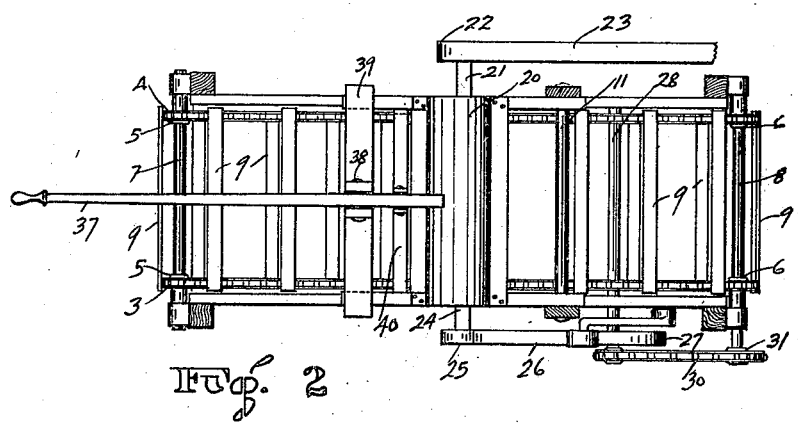
Fig. 2 represents a top plan view of the machine.
Figure 3:
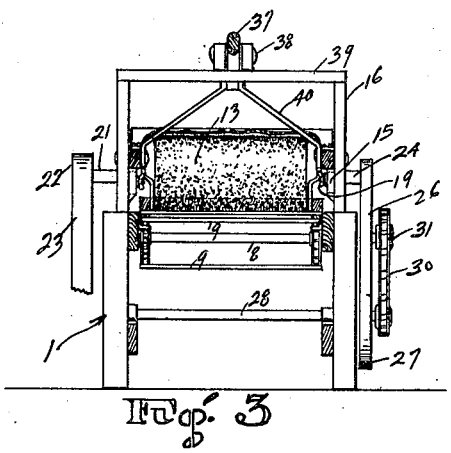
Fig. 3 represents an end elevation of the machine.

In the embodiment of the invention shown in the accompanying drawing the machine comprises an elongated, rectangular skeleton frame 1 on the upper side of which is supported an endless conveyor 2, the conveyor being horizontally disposed and at such an elevation that an operator may readily pick up the fruit trays and move them onto the conveyor. The conveyor 2 comprises endless chains 3 and 4 mounted on a pair of sprockets 5, at one end of the frame and on a similar pair of sprockets 6 at the other end of the frame. These sprockets are mounted on shafts 7 and 8 suitably journaled in the frame. Extending transversely between and joined with the chains are a plurality of fruit tray supporting slats 9. The length of the conveyor may be varied as desired but preferably the length is greater than that of the ordinary fruit tray.

A brush supporting frame 10 is pivoted as at 11 to upright extensions 12 of the frame and is adapted to be swung up and down to regulate the position of the cylindrical rotary brush 13 supported in bearings 14 between the ends of the frame 10. The brush may be of any suitable material but is preferably constructed of steel bristles so that a thorough brushing and cleaning action may be effected. The free end of the brush supporting frame 10 is adapted to rest upon vertically adjustable stop blocks 15 supported on upright extensions 16 of the frame. These blocks are provided with slots 17 through which bolts 18 carried by the extensions 16 extend, there being wing nuts 19 on the bolts to provide for securing the blocks in adjusted position. The brush may be supported at different elevations dependent upon the kind and size of the trays to be cleaned. These blocks may be employed for regulating the brushing action and also as a means for preventing the entire weight of the heavy brush and its supporting mechanism from being placed upon the trays during the cleaning operation to prevent wearing away of the trays or other damage thereto.

The brush is provided with a suitable hood or guard 20 to prevent scattering of the material brushed off of the trays. On one trunnion 21 of the brush there is provided a pulley 22 driven by a belt 23 which is operated by a suitable source of power or prime mover, not shown. On the other trunnion 24 is a pulley 25 and a loose belt 26. This belt is extended around the pulley 27 on a shaft 28 journaled in the lower part of the frame 1. A small sprocket wheel 29 is mounted on the shaft 28 and drives a chain 30 which is extended around the sprocket wheel 31 on the conveyor shaft 8. By this arrangement the conveyor is driven at a comparatively slow speed from the brush trunnion whereas the brush is rotated at a high rate of speed so as to produce an effective brushing and cleaning action.

The trays are placed upon the conveyor 9 and moved by said conveyor towards the brush, which brush is of necessity normally disposed with its lower side just clearing the upper side of the conveyor. The forward edge of the tray as shown at A will encounter downwardly and forwardly curved adjustable shoes 32 carried by the brush supporting frame adjacent the ends of the brush. These shoes are so curved and positioned that the front and rear upright walls of the tray will engage them and prevent contact of the brush with said walls. Inasmuch as the trays are provided with upstanding flanges or walls on their ends and sides, the engagement of the end walls of the tray with the shoes lifts the brush and brush frame so that the brush clears said walls in moving into and out of contact with the bottoms of the trays. The lower ends of the shoes are disposed above the plane of the lower side of the brush to cause the bristles of the brush to flex before contact of the shoes with the tray during the brushing operation. In this way the trays act to automatically lift the brush over the ends thereof so that the brush will be moved into and out of proper engagement with the tray bottoms as the trays are advanced beneath the brush on the conveyor. These shoes together with the adjustable stop blocks are important features of the invention inasmuch as the brush and its associated elements are of considerable weight and should brushing action take place with the entire weight of the brush and associated parts supported by the tray, the trays might be unduly worn or otherwise damaged in a short time, also the heavy brush if permitted to encounter the end walls of the tray would loosen and knock out said walls.

To maintain sufficient frictional engagement between the belt 26 and the pulleys associated therewith and at the same time permit sufficient slack to permit of vertical adjustment of the brush, I have provided an idler pulley 34 which is mounted on the outer end of the arm 35, pivoted as at 36 on the main frame, the weight of this pulley and arm being supported by the upper run of the belt.

To provide for a manual operation of the brush to lift the same over the ends of the tray into contact with the tray bottom principally so as to so operate the brush in case of failure of the automatic lifting means and also to apply added pressure to the brush, I employ a lever 37 pivoted between its ends as at 38 on a cross piece 39 of the frame extension 16. By means of a yoke 40 the adjacent end of the lever is connected with the free end of the brush supporting frame so that it is only necessary for the operator to reach upward and pull down on the free end of the lever 37 to raise the brush clear of the upstanding ends of the trays and to then lower the brush in contact with the bottoms of the trays. This lever is disposed adjacent the intake end of the machine in a position so that it may be conveniently reached by the operator standing at a point where the trays are fed into the machine. With an exceptionally dirty tray it may be desirable to increase the brush pressure on the tray and the operator then pushes upward on the lever to apply an added pressure to the brush.

With the machine of this invention a large number of trays may be thoroughly and effectively cleaned in less time and at less cost than with other machines of which I am aware. One of the points of advantage of this machine is that it will provide for a thorough cleaning without causing an undue wearing away or other damage to the trays, this being particularly due to the adjustable stops, manner of adjustably supporting the brush and also the shoes for automatically lifting the brush over the ends of the tray. By mounting the brush approximately centrally of the ends of the conveyor and providing a comparatively long conveyor, fruit trays of the largest sizes commonly used and of smaller sizes, may be cleaned with equal facility.

Another further advantage is the provision of the combined automatic and manually operated brush lifting means whereby if for any reason the automatic means fails to lift the brush, the operator may readily grasp the lever 37 and due to the length of said lever, easily lift the brush as will be done automatically, thus preventing the jamming or "shut down" of the machine and insuring a continuous operation thereof. The shoes may be adjusted to compensate for wear on the brushes.

I claim:

1. A machine for cleaning fruit trays comprising a frame, a conveyor for moving the fruit trays along the frame, a rotary brush, means for vertically adjustably supporting the brush above the conveyor in position to engage the fruit trays as the latter are moved past the brush by the conveyor, means for rotating the brush and conveyor, an operating lever pivoted on the frame and operatively connected with the adjustable brush support, an adjustable stop member on the frame with which said brush support engages and shoes carried by the brush support and arranged to engage the end walls of the tray.

2. A machine for cleaning fruit trays comprising a frame, a fruit tray conveyor on the frame, a rotary brush, means for vertically adjustably supporting the brush above the conveyor in position to engage the fruit trays as the latter are moved past the brush on the conveyor, means for rotating the brush and conveyor, an operating lever pivoted between its ends on the frame, means of connection between one end of the operating lever and the adjustable brush support and fruit tray engaging shoes carried by the brush support and extending downwardly adjacent the lower side of the brush.

3. A machine for cleaning fruit trays comprising a frame, a conveyor for moving the fruit trays along the frame, a rotary brush, means for vertically adjustably supporting the brush above the conveyor and vertically adjustable shoes carried by and extending downwardly from the brush support with the lower ends thereof adjacent the lower side of the brush, which shoes are adapted to engage the trays.

JOHN W. ROBINSON.